(12) United States Patent
Mecham et al.

(10) Patent No.: US 6,507,433 B2
(45) Date of Patent: Jan. 14, 2003

(54) METHOD AND APPARATUS FOR PREVENTING APPLICATION OF EXCESSIVE FORCE BETWEEN MICROSCOPE OBJECTIVE AND STAGE

(75) Inventors: Jason Mecham, Maple Valley, WA (US); Steve Lytle, Woodinville, WA (US)

(73) Assignee: Westover Scientific, Inc., Woodinville, WA (US)

( * ) Notice: Subject to any disclaimer, the term of this patent is extended or adjusted under 35 U.S.C. 154(b) by 0 days.

(21) Appl. No.: 09/833,542

(22) Filed: Apr. 11, 2001

(65) Prior Publication Data

US 2002/0015223 A1 Feb. 7, 2002

Related U.S. Application Data

(63) Continuation of application No. 09/415,614, filed on Oct. 8, 1999, now abandoned.

(51) Int. Cl.⁷ .............................................. G02B 21/00
(52) U.S. Cl. ...................... 359/379; 359/368; 359/383; 359/392
(58) Field of Search .................... 359/368, 375–384, 359/391–398, 821

(56) References Cited

U.S. PATENT DOCUMENTS

| | | |
|---|---|---|
| 4,531,816 A | 7/1985 | Baumgartel ................. 359/368 |
| 4,653,878 A | 3/1987 | Nakasato et al. ........... 359/381 |
| 4,878,746 A | 11/1989 | Nakano et al. ............. 359/368 |
| 4,912,388 A | 3/1990 | Tanaka et al. .............. 318/640 |
| 5,315,080 A | 5/1994 | Kaczynski et al. ......... 359/392 |
| 5,861,985 A | 1/1999 | Ikoh .......................... 359/388 |

FOREIGN PATENT DOCUMENTS

| | | |
|---|---|---|
| JP | 56-55917 | 5/1981 |

*Primary Examiner*—Thong Nguyen
(74) *Attorney, Agent, or Firm*—Dorsey & Whitney LLP

(57) ABSTRACT

A method and apparatus for preventing excessive closure between a retractable tip objective and the stage of a microscope which includes positioning a sensor in the turret of a microscope, which sensor is capable of detecting excessive retracting of the retractable tip into the body of the objective, and providing a controller for monitoring the sensor for such excessive retracting and issuing an alert in response to the detection of an event of such excessive retracting. The alert may be made by way of an audio output, or by a visual cue or both. Extinguishing the lamp of the microscope is a preferred visual cue, as the excessive retracting of the retractable tip is generally caused by a focusing error, and the extinguishing of the light source reduces or eliminates the ability of the user of the microscope to focus the microscope, thus attracting his or her attention.

16 Claims, 4 Drawing Sheets

METHOD AND APPARATUS FOR PREVENTING APPLICATION OF EXCESSIVE FORCE BETWEEN MICROSCOPE OBJECTIVE AND STAGE

This is a continuation of application Ser. No. 09/415,614, filed Oct. 8, 1999, now abandoned.

FIELD OF THE INVENTION

The present invention relates to the field of optical microscopes, and, in particular, to a method and apparatus for the prevention of application of excessive force between the objective or objective housing of a microscope and the stage thereof.

BACKGROUND OF THE INVENTION

Modern optical microscopes are generally equipped with an eyepiece or eyepieces which are mounted to a microscope. Multiple objective lenses are mounted to the microscope-body and are carried by a turret which allows each lens in turn to be rotated into a light path extending through the microscope body from the objective to the lenses in the eyepieces. The sample to be studied is generally placed on a stage which is likewise mounted to the body of the microscope at a position beneath the objective. Illumination is frequently provided by means of a lamp mounted below the stage which is positioned to shine upward through an aperture in the stage. Biological microscopes typically require the sample to be mounted on a glass slide which is in turn placed on the stage where it may be held in place by clips. To focus the image, the distance between the objective and the stage is adjusted. This is generally accomplished by raising and lowering the stage, but is sometimes accomplished by raising and lowering the objective. For simplicity, the relative motion of the stage and objective will be discussed as raising and lowering of the stage, since raising and lowering of the objective produces essentially the same result.

The raising and lowering of the stage is generally accomplished by means of one or more focusing knobs located on the side of the microscope body. The knobs may include a fine adjustment knob and a coarse adjustment knob. The turning of the fine adjustment knob through a given angle results in less motion of the stage than the turning of the coarse adjustment knob.

When a sample is out of focus and the user is looking through the eyepiece or eyepieces of the microscope, the user does not see the fine detail of the sample. Rather, the user may only see a blurred and indistinct image. As the sample begins to come into focus, the blurring abates and the fine detail of the sample can be perceived. The transition from a blurred image to an in-focus image occurs over a rather short range of travel of the stage, particularly at high magnifications. As a result, finding the focus can be rather difficult, and it is not uncommon for a microscope user to turn the focus adjustment knobs in the wrong direction while seeking focus.

If the user raises the stage too high during the focusing process, contact between the objective and the slide may result. If too much pressure is applied at this point, the slide can break, the sample can be spoiled and the objective can be contaminated. The slide breakage problem is particularly acute with higher magnification objectives. This problem of slide breakage is longstanding, and affects even experienced microscope users.

Various means of reducing or eliminating the problem have been devised. One approach to avoiding the problem of slide breakage is the use of retractable objective carriers. According to this approach, the objective lenses of the microscope are mounted in carriers which are slidably mounted in the objective housings. Other lenses may be fixedly mounted in the objective housing. A spring acts between the objective housing and the carrier to bias the carrier to its fully downwardly-extended position. Flanges or stops on the objective housing and carrier retain the carrier within the objective housing.

If a user of such a microscope raises the stage to the point where the carrier touches the slide, the carrier retracts into the objective housing. Generally, such carriers are capable of being retracted up to about ¼ inch (6.4 mm). At this point, the carrier reaches an internal stop which prevents it from retracting further into the objective housing. Such retractable objective carriers are seldom employed with lower power objectives, such as 2× through 10× objectives. Occasionally, they are found on 20× objectives, but, more commonly, they are used only on objectives of 40× or 100× or greater. The reason for this is that the higher power lenses typically have a much shorter working distances. For example, the working distance of a 100× objective is about 0.6 mm. Thus, even a minor amount of adjustment of the stage can result in breakage of the slide. As a result, the retractable objective carrier has not provided a complete solution to the slide breakage problem.

Another approach that has been taken is the providing of mechanical stops that limit the upward travel of the stage. Such stops may work in cooperation with the fine and coarse adjustment mechanisms, and are generally adjustable. The stop is generally intended to be set to prevent the coarse adjustment mechanism from raising the stage above a user-selected point. Typically, manuals for microscopes having such stops suggest that the stops be set using the highest power objective, which is typically 100×. The sample is first placed in focus at this setting, and the stop is then set. Since most modern microscopes are parfocal (all lenses focus on a given sample at the same stage elevation), no lens should need to have the stage raised beyond this point. This provides the two benefits of reducing slide breakage and allowing the focusing the microscope a single time, and achieve focus with any lens by adjusting the coarse focus until the stop is reached. Stops are generally not associated with the fine focus.

Unfortunately the use of stops has not eliminated slide breakage. First, few users know how to adjust the stops properly. In addition, many users who are familiar with the stop mechanism choose not to take the time to set it up and use it. Those users who do set the slide mechanism properly frequently do not check the adjustment on a daily basis. Finally, commercially-available slides vary in thickness, as do samples that are to be observed. As a result, frequent resetting of the stop would be necessary for each sample to ensure that slide breakage is avoided. Even if the stop is properly set, it should be noted that current stops only affect the coarse adjustment. Slide breakage frequently occurs as a result of use of the fine adjustment mechanism.

Thus, there remains an unfulfilled need for a system that will prevent slide breakage during adjustment of the height of the stage.

SUMMARY OF THE INVENTION

The present invention provides a method and apparatus for reducing slide breakage due to raising of the stage into contact with an objective. This is accomplished by the use of retractable objective carriers slidably mounted in the objective housings. A proximity sensor is positioned above the carrier, and is configured to detect the proximity of the carrier before the upper stop is reached. When the proximity sensor detects the proximity of the carrier (or an extension of the carrier), the system is activated to emit an audible signal and to extinguish the stage light that illuminates the sample. The extinguishing of the light serves as an indication that the stage has been raised too high. Further attempts to focus the microscope on the sample by further raising the stage are discouraged by the fact that the sample generally is not sufficiently visible for focusing once the light has been extinguished.

DETAILED DESCRIPTION OF THE PREFERRED EMBODIMENT

Figure 1:
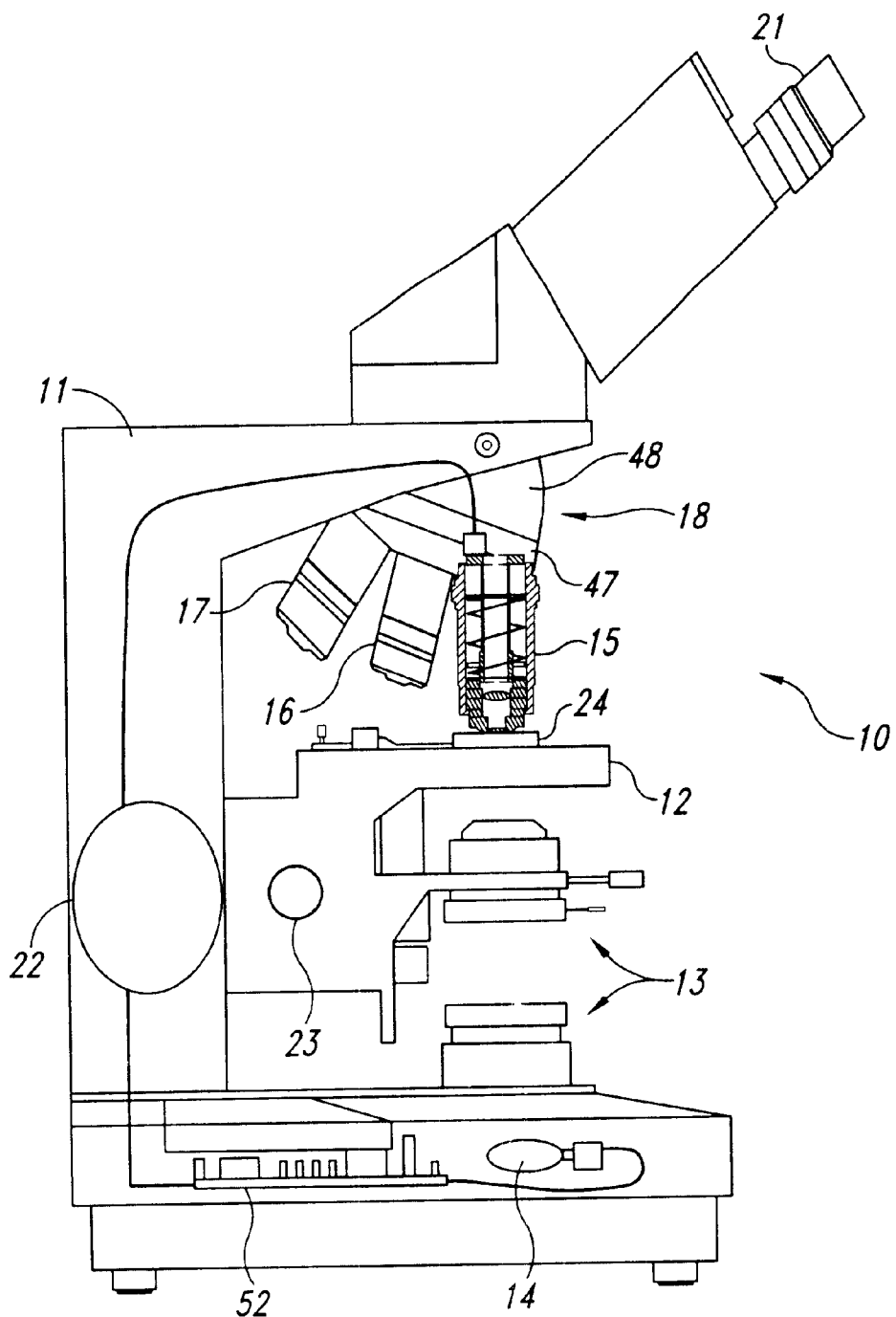
FIG. 1 is a side elevation of a microscope according to the present invention with one objective shown in cross-section.

Referring first to FIG. 1, a typical microscope 10 has a frame 11, a stage 12 slidably mounted to the frame, an illuminator system 13 for transmitting light from a bulb 14 through an aperture in the bottom of the stage 12. The microscope is typically fitted with three or more objectives 15–17 which are mounted on a turret 18. The objectives receive light from the bulb 14 and transmit it along a light path to the eyepiece 21.

The principal means of focusing the microscope is by use of the coarse adjustment 22 and fine adjustment 23. The coarse adjustment 22 is turned to raise and lower the stage. The fine adjustment 23 moves the stage 12 a smaller amount per rotation than the coarse adjustment to facilitate precise focusing. Typically, a specimen is mounted on the microscope stage by placing it on a slide 24 and placing the slide on the stage 12. The coarse and fine adjustment knobs 22, 23 are then used to adjust the position of the stage nearer to or farther away from the selected objective 15–17 in order to bring the specimen into focus.

Figure 2:
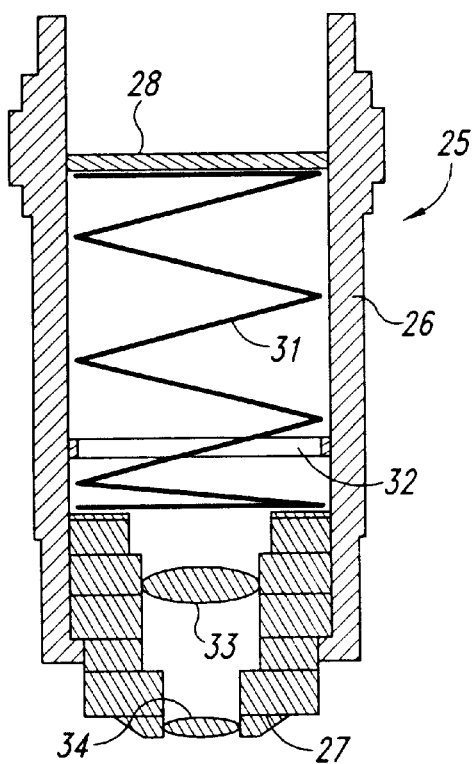
FIG. 2 is a cross-sectional view of a retractable tip objective of the prior art.

Conventional retractable tip objectives 25, such as that shown in FIG. 2, have been known in the art for some time. Such objectives include a barrel 26, a retractable tip 27 slidably mounted in the barrel 26, a retaining annulus 28 and a spring 31 mounted between and acting between the lower surface of the retaining annulus 28 and the upper surface of the retractable tip 27. The lower end of the barrel 26 is flanged inwardly and the upper portion of the retractable tip 27 is flanged outwardly such that the retractable tip 27 is maintained in the barrel 26, but is free to slide up into the barrel 26 against the force of the spring 31. The amount of travel allowed, however, is not unlimited. An annular stop 32 is positioned in the barrel to restrict the upward travel of the retractable tip 27 in the barrel 26. Lenses 33, 34 are mounted in the retractable tip 27 of the objective 25.

Focusing of microscopes is generally accomplished by raising or lowering the stage relative to the objective. Some microscopes, however, are focused by raising and lowering the objective relative to a stage which is fixed to the frame, but the present invention works equally well, and in essentially the same manner, with such microscopes. Accordingly, reference will be made herein only to the moveable stage type microscopes.

Unfortunately, the task of focusing a microscope is not error free. If the user believes that the microscope stage 12 needs to be raised in order to bring the sample into focus, the stage may be raised into contact with the objective. The user may not realize that the focus is being turned in the wrong direction because the image may be so out of focus that continuing to turn the coarse adjustment 22 or fine adjustment 23 in the wrong direction does not cause a change in the image that can be interpreted as further defocusing rather than as travel toward the proper focus point. Eventually, the retractable tip 27 may be retracted far enough to contact the annular stop 32. At this point, any further turning of the coarse or fine adjustment 22, 23 can cause excessive pressure on the slide, which can break the slide 24. This can result in several problems in addition to the slide breakage. First, the sample may be spoiled. This will require preparation of another sample, assuming additional sample material is available. Another problem that may result is that the tip of the objective and/or the lens may become contaminated.

Figure 3:
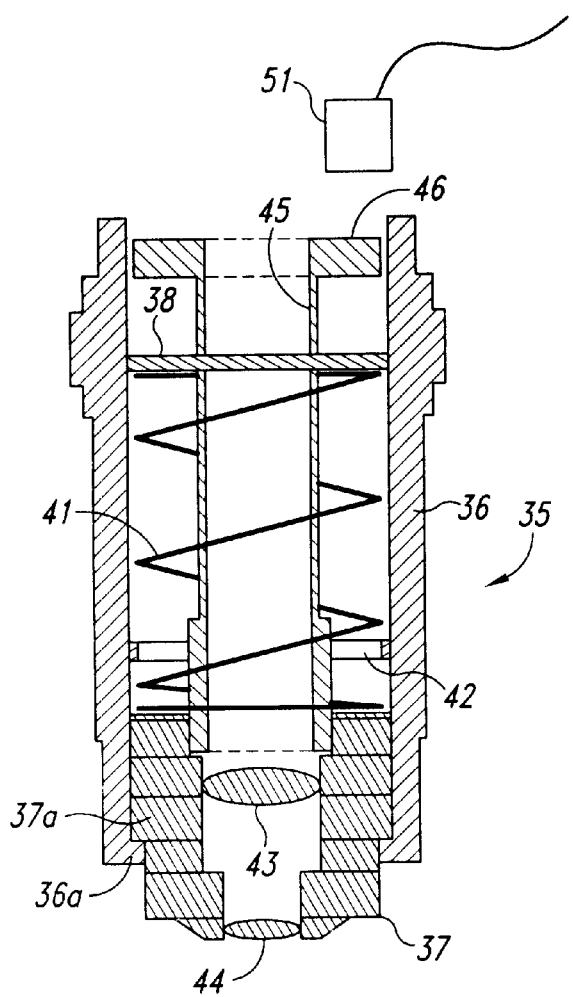
FIG. 3 is a cross-sectional view of a retractable tip objective according to the present invention.

A preferred objective 35 according to one embodiment of the present invention is shown in FIG. 3. The present invention greatly reduces the risk of such problems by providing a simple, reliable, inexpensive method of detecting retraction of the retractable tip 37 into the barrel 35 and warning the microscope user before the retractable tip 37 reaches the annular stop.

The objective 35 of the preferred embodiment comprises a barrel 36, a retractable tip 37 slidably mounted in the barrel 36 and retained therein by an inward flange 36a at the lower end of the barrel 36. The flange 36a cooperates with an outwardly-extending flange 37a on the retractable tip 37 to prevent the retractable tip 37 from sliding out of the lower end of the barrel 36. A retaining annulus 38 is mounted toward the upper end of the barrel 36, and a spring 41 is mounted between the annulus 38 and the upper surface of the retractable tip 37 to bias the retractable tip toward the lower end of the barrel 36. Upward travel of the retractable tip 37 into the barrel 36 is limited by an annular stop 42 affixed to the interior of the barrel 36. The lenses 43, 44 of the objective 36 are mounted in the retractable tip 37.

An activator tube 45 is mounted coaxially with the retractable tip 37 as by screw threads or pressing and extends upward therefrom. A lens or lenses could be mounted in the activator tube in addition to the lens or lenses 43, 44 in the retractable tip 37. The upper end of the activator tube 45 includes a flange 46, the upper surface of which is reflective to infrared light. The tube 45 extends through the center opening of the retaining annulus 38 and is of a diameter that permits free movement therethrough when the retractable tip 36 is moved axially within the barrel 36. The inside diameter of the activator tube 45 is sufficiently great that it does not interfere with the transmission of light along the light path between the lenses 43, 44 of the objective 35 and the eyepiece 21 of the microscope 10.

Referring next to FIGS. 1 and 3, the turret 18 of the microscope 10 includes the objective carrier 47 which is rotatably mounted to the upper, fixed portion 48 of the turret 18. Rotation of the objective carrier 47 moves the objectives 15–17 in turn into the light path. A sensor 51 is mounted to the fixed portion 48 of the turret 18 adjacent to the light path. This sensor 51 is preferably a reflective object sensor that includes an infrared light emitting diode ("ILED") and a phototransistor mounted with their axes parallel to one another. Preferably, both the ILED and the phototransistor are contained in a single package that is opaque to visible light but which transmits infrared light. The devices are configured such that light does not shine directly from the ILED to the photo transistor. One such device is the sensor sold by Optek Technology, Inc. of Carrollton, Tex. under the model number OPB 608A. This sensor 51 is contained within an opaque housing and the ILED and phototransistor are encapsulated in a filtering epoxy which further reduces ambient light noise. The sensor 51 must be mounted sufficiently close to the objective carrier 47 portion of the turret 18 that it can sense the proximity of the flange 46 of the activator tube 45 when the activator tube 45 has been moved upward through the barrel 36 by upward movement of the retractable tip 37.

The activator tube 45 is sufficiently long and the flange 46 sufficiently broad that the sensor 51 will detect the proximity of the activator tube 45 before the retractable tip 37 of the objective 35 reaches the annular stop 42. The activator tube, however, must not be so long as to contact any structure in the interior of the fixed portion 48 of the turret 18, including the sensor 5 1, which is mounted to the fixed portion 48 of the turret 18.

Some or all of the objectives 15–17 of the microscope may be equipped with activator tubes. The activator tubes may of necessity be of different lengths for different objectives, given differences in the length of the barrels 36. It is important, however, that the length of the activator tubes 45 for each objective be chosen such that an alert can be issued before the associated objective has been retracted into the barrel 36 far enough to contact the annular stop 42.

The present embodiment of the invention is also highly desirable as no wires or other structure needs to protrude into the objectives 15–17 or from the fixed portion 48 of the turret 18 into the objective carrier. Further, there is no need for slip rings or other such connections in order to transmit power into the rotatable section of the turret 18 and its associated members.

Figure 5:
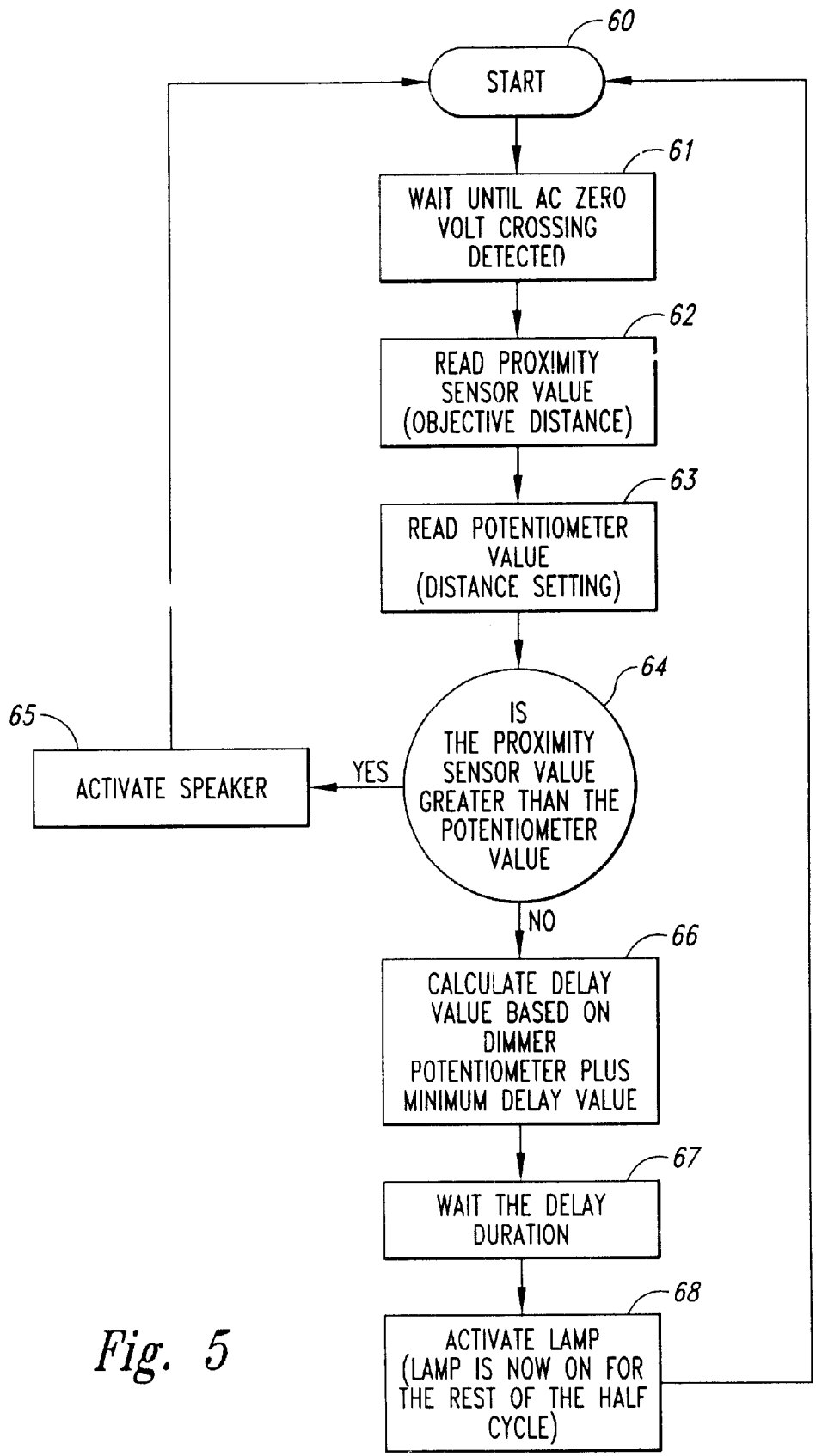
FIG. 5 is a flow diagram of the operating program for the device according to the present invention.

The sensor 51 is connected to a controller 52, which, referring to FIG. 5, may include a microcontroller device. Of course, the sensor 51 function of the controller is to monitor the output of the sensor 51 and, upon the sensor 51 sensing the flange 46 of the activator tube, to output an alert, which may comprise an audio tone output via a speaker or buzzer or the extinguishing of the bulb 14, or, preferably, both.

Many different types of proximity sensors may be used, including leaf springs, microswitches, break-beam sensors, magnetic and inductive proximity sensors, and pressure sensors. One inexpensive, adjustable, reliable sensor that has been found to function well for this application is the reflective object sensor, such as that sold by Optek Technology, Inc. of 1215 Crosby Road, Carrollton, Tex. 75006 under the model number OPB6808A. Such sensors may consist of an infrared emitting diode and an NPN silicon phototransistor mounted beside one another, with both devices being mounted on parallel axes. The devices are unfocused and are contained in a housing that is sufficiently transparent to the infrared light emitted by the infrared emitting diode, but which blocks a significant portion of the visible spectrum. The sensitivity of the device can be adjusted by an external resistance device such as a resistor or potentiometer, so the microscope according to the present invention may be calibrated to signal retraction of the retractable portion of an objective before it reaches the internal stop.

Figure 4:
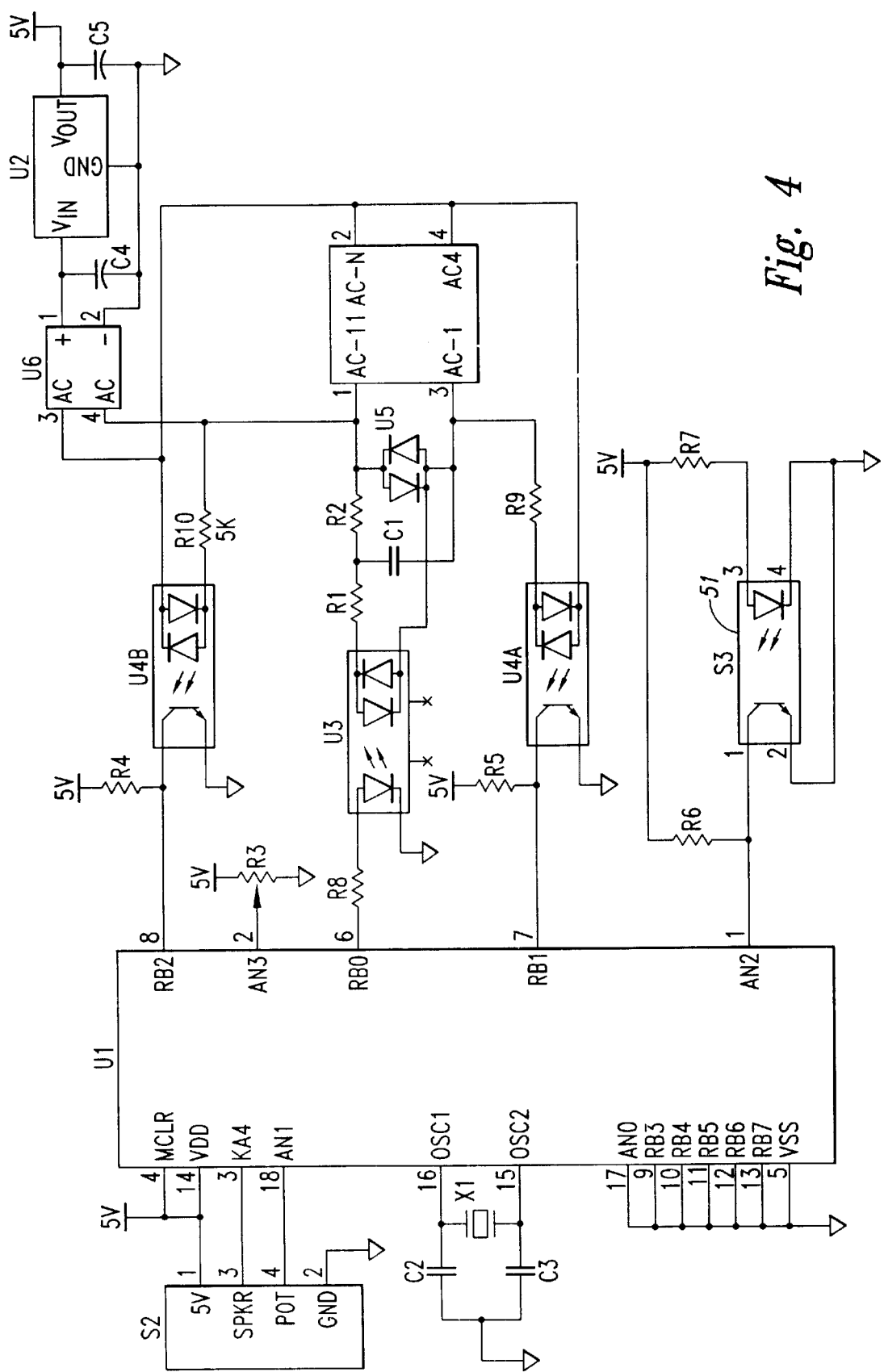
FIG. 4 is a schematic diagram of a controller circuit for the device according to the present invention.

FIG. 4 is an electrical schematic of a microcontroller operated circuit for practicing the invention. In the embodiment of the invention depicted in this figure is based on a microcontroller U1 such as the model PIC16C71 microcontroller with analog-to-digital inputs sold by Microchip Technologies, Inc. of Chandler, Ariz. This microcontroller U1 incorporates the microprocessor, RAM and non-volatile memory onto a single integrated circuit, together with a plurality of analog to digital inputs. The microcontroller U1 is connected to a timing crystal X1 and associated electronics in a known manner, and to a terminal block S2 which is in turn connected to a speaker and lamp dimmer potentiometer (not shown).

Still referring to FIG. 4, power is applied to the system through terminal block S1, in which the alternating current power is applied to pins 1 and 2. Pins 3 and 4 of the terminal block S1 are connected to the lamp 14 in the illuminator system 13. AC power flows from the terminal block S1 to the full wave rectifier U6, and direct current is applied from the full wave rectifier U6 to the 5V voltage regulator U7, which supplies regulated direct current power to the circuitry as indicated.

An AC optoisolator U4B is connected across pins 1 and 2 of the terminal block S1 to which the AC power is applied. This provides a signal to an analog input of the microprocessor U1 for each zero volt crossing of the AC power. This signal is used to restart the logic sequence of the microcontroller Ul.

Potentiometer R3 is connected to another analog input of the microcontroller U1. This potentiometer R3 is also connected between the 5V DC power and ground circuitry and provides a sensitivity adjustment for the proximity detector circuitry.

Optotriac U3 is connected to an output of the microcontroller for operating the bulb. When a signal is received by the optotriac U3 from the microcontroller U1, the optotriac U3 triggers the triac U5 to provide power to the bulb in the illuminator system 13. In the absence of such signal from the microcontroller U1 the optotriac U3 and the triac U5 reset when the AC power crosses zero volts.

AC optoisolator U4A is connected across the bulb 14 of the illuminator system 13, and is used to check whether the bulb 14 is on, and is connected to an input of the microcontroller U1. The proximity detector is connected to an analog input of the microcontroller U1.

The software installed in the non-volatile memory of the microcontroller operates the circuitry in the following manner. Referring to FIG. 5, the microcontroller U1 begins execution at the start 60. The first step 61 is a loop in which the microcontroller continuously checks for receipt of a signal from AC optoisolator U4B indicative of a zero voltage crossing by the AC power applied to the circuitry. Upon receiving such a signal, the microcontroller U1 executes the next step 62 of reading the digitized value of the signal output by the proximity detector 51. This value is compared in the subsequent step 63 with a value generated from the analog input based on the setting of the adjustment potentiometer R3 in the next step 64.

At this stage 64, if the comparison value indicates that proximity of the surface 46 of the activator tube 45 has been detected, thus indicating that the trigger point has been reached, the microcontroller U1 activates the speaker, and returns to the step 61 of looping until a zero volt crossing in the AC power is detected without activating the optotriac U3 and hence without providing power to the lamp 14.

If the trigger point has not been reached, the microcontroller U1 proceeds to the next step 66. In this step 66, a delay value is calculated based on a minimum delay value plus a delay value derived from the digitized value of the voltage received from the dimmer potentiometer (not shown) connected to the terminal block S2. This potentiometer is connected between the 5V DC power and ground and is adjustable in like manner to potentiometer R3 to provide a selected voltage output to the microcontroller U1.

The microcontroller U1 uses this calculated value in the next step 67. The microcontroller executes a delay loop based on the calculated value and decrements the value on each iteration of the loop until the value has been decremented to zero. At this stage, the microcontroller U1 activates the optotriac U3 which, in turn, activates the triac U5 which supplies power to the lamp The optotriac U3 and triac U5 continue to provide power to the lamp until the next zero volt crossing of the AC power supplied to the system. As such, the greater the calculated value, the longer the delay will be before the lamp begins receiving power. The delay is calculated such that it is never more than one half of a power cycle of the AC power.

Upon expiration of the delay cycle and activation of the optotriac U3, the program jumps back to the start 60 and commences the step of waiting for a zero voltage crossing in the AC power to the system.

The sensor 51 of the preferred embodiment has been described herein as an infrared proximity detector device. Other devices, such as leaf springs, microswitches, break-beam sensors, magnetic and inductive proximity sensors, and pressure sensors might be used in lieu of the infrared proximity detector described herein all within the scope of the present invention. Of course, the use of different types of detectors may dictate changes in the configuration of the activator tube 45. For example, a magnet might be attached thereto in the event that a magnetic proximity detector were used.

Unlike systems which incorporate stops to prevent excessive raising of the stage, the present system has the advantage of not requiring any expertise on the part of the user. The sounding of the tone and the extinguishing of the light are generally sufficient to stop even an inexperienced microscope user with no knowledge of the system from continuing to turn the focus adjustment knobs. It also has the advantage of continuing to function properly despite changes in slide or sample thickness. The system can be assembled with a single proximity sensor mounted to the stationary portion of the turret, so that a separate proximity sensor is not needed for each objective, and so that no wiring needs to extend into the objective housing, with the added complexity, need for slip rings or other contacts, and cost that would otherwise be entailed.

What is claimed is:

1. A sensor system for a retractable tip microscope objective, the microscope objective comprising a substantially-hollow barrel having first and second ends and a retractable tip slidably mounted in the barrel adjacent the first end, the retractable tip being extendable outward through the first end of the barrel, movement thereof into and out of the first end of said barrel being constrained by a stop, the sensor system comprising:

a proximity sensor mountable adjacent the second end of the barrel;

an elongated member extending into the barrel and having a distal end for detection by the proximity sensor upon retraction of the retractable tip into the barrel by a predetermined amount; and a controller connected to the proximity sensor for generating an alert in response to detection of the distal end of the elongated member upon retraction of the retractable tip into the barrel by the proximity sensor.

2. The sensor system of claim 1 wherein the sensor is mountable in a microscope having a turret, the turret having fixed and rotatable portions, and the sensor being mountable in the fixed portion of the turret such that the rotatable portion may be rotated without interference from the fixed portion.

3. The sensor system of claim 1 wherein said elongated member comprises a surface at its distal end which surface reflects infrared light and wherein the sensor comprises an infrared proximity sensor.

4. The sensor system of claim 1 wherein the controller is connectable to a microscope illuminator for reducing power to the illuminator when the sensor is activated by the distal end of the elongated member.

5. A method of providing an alert to a microscope user to retraction of a retractable tip objective having a retractable tip slidably mounted in a barrel into the barrel of said objective on a multiple-objective microscope having a turret comprising a fixed portion and a movable portion, and having an electric illumination system, and the retractable tip objective comprising a retractable tip slidably mounted in a barrel, the method comprising the steps of:

providing an elongated member extending from the retractable tip into the barrel of the objective, the elongated member having a length such that it does not extend inwardly of a turret of a microscope to the extent that the elongated member would interfere with movement of the movable portion of said turret relative to the fixed portion of the turret;

sensing retraction of the retractable tip into said barrel using a sensor mountable in the turret of a microscope to the fixed portion thereof, the sensor producing a signal in response to such retraction; and generating an alert in response to the signal to alert a microscope user to such retraction.

6. The method of claim 5 wherein the step of generating an alert includes the step of reducing of power to said illumination system.

7. The method of claim 6 wherein said step of generating an alert includes the step of producing an audible tone.

8. A microscope having an overfocus alert system comprising:

a microscope body, a turret, the turret comprising a fixed portion and a movable portion movably mounted to the fixed portion, a plurality of objectives mounted to the movable portion of the turret, the movable portion of the turret being movable to selectively position the objectives relative to the fixed portion of the turret, a stage, the turret and stage being mounted to the microscope body such that they are repositionable relative to one another to permit focusing of said microscope, and an electrically operated illuminator system mounted to the body for providing illumination of samples carried by the stage, at least one of the plurality of objectives being a retractable tip objective having a barrel and a retractable tip slidably mounted therein;

a sensor mounted to the fixed portion of said turret;

an elongated member extending into the barrel of the objective toward the turret and having a distal end, and being retractable with retraction of the retractable tip into the barrel, the sensor producing a signal which is changeable in level in response to detection of the distal end of the elongated member when the retractable tip is retracted into the barrel; and an alert system for receiving the signal and producing an alert in response to the change in signal level by the sensor in response to changes in position of said retractable tip relative to the sensor.

9. The microscope of claim 8 wherein the alert system is electrically connected to said illuminator system, and wherein the alert system provides an alert by reducing electrical power to the illuminator system.

10. The microscope of claim 9 wherein the alert system further comprises an audible sound generating system and wherein said alert system activates the sound generating system to produce an audible alert in response to changes in the level of the signal.

11. The microscope of claim 10 wherein the audible sound generating system of the alert system comprises a sound generator selected from the group consisting of a speaker, a buzzer, and a piezoelectric tone generator.

12. The microscope of claim 8 wherein the sensor comprises an infrared light sensor and an infrared light emitter, wherein the elongated member comprises a tube having a flange at the distal end thereof, the flanged portion of the tube being reflective to infrared light emitted by the infrared light emitter, the sensor producing the change in signal level in response to sensing by the infrared light sensor of a change in the level of infrared light reflected by said flange.

13. The microscope of claim 8 wherein said plurality of objectives comprises a plurality of retractable tip objectives each being movable to a position adjacent said sensor by movement of said movable portion of said turret, each such retractable tip objective having an elongated member extending toward said turret.

14. A sensor system for a retractable tip microscope objective, the microscope objective comprising a substantially-hollow barrel having first and second ends and a retractable tip slidably mounted in the barrel adjacent the first end, the first end of the retractable tip being extendable outward through the first end of the barrel, movement of the retractable tip out of the first end of the barrel being constrained by a stop, the second end of the retractable tip being retained within the barrel by the stop, the sensor system comprising:

a member mountable to the second end of a retractable tip of the retractable tip objective objective such that the member is retracted from a first position to a second position relative to the barrel of the objective upon retraction of the retractable tip into the barrel;

a sensor mountable adjacent the second end of the barrel for outputting a signal in response to the change in position of the member between the first and second positions without contact between the sensor and the member; and a controller connected to the proximity sensor for generating an alert in response to the signal.

15. The sensor system of claim 14 wherein the sensor comprises an infrared light emitter and an infrared light detector, and wherein the member comprises a reflector for reflecting infrared light from the infrared light emitter to the infrared light detector.

16. The sensor system of claim 14 wherein the controller is connectable to the illumination system of a microscope and wherein the alert constitutes a reduction in the power to the illumination system.

* * * * *